United States Patent [19]
Doi

[11] Patent Number: 5,406,536
[45] Date of Patent: Apr. 11, 1995

[54] OPTICAL DISC APPARATUS HAVING IMPROVED READ ACCURACY WITH NON-LINEAR SERVO SIGNAL GAIN DURING TRACK ACCESS AND FOCUS INITIALIZATION

[75] Inventor: Akihiko Doi, Tokyo, Japan

[73] Assignee: Kabushiki Kaisha Toshiba, Kawasaki, Japan

[21] Appl. No.: 108,519

[22] Filed: Aug. 18, 1993

[30] Foreign Application Priority Data

Aug. 24, 1992 [JP] Japan .................. 4-223930

[51] Int. Cl.⁶ .............................. G11B 7/085
[52] U.S. Cl. .................. 369/44.28; 369/44.29; 369/44.34
[58] Field of Search ........ 369/32, 44.28–44.29, 369/44.34, 44.35–44.36

[56] References Cited

U.S. PATENT DOCUMENTS 4,876,679 10/1989 Mukai ................ 369/44.29
4,975,895 12/1990 Yanagi ............... 369/44.29
5,146,443 9/1992 Iwase et al. ......... 369/44.29
5,202,871 4/1993 Yokota .............. 369/44.29
5,257,252 10/1993 Barnes et al. ........ 369/44.29

FOREIGN PATENT DOCUMENTS

4-49530 2/1992 Japan .

Primary Examiner—W. R. Young
Attorney, Agent, or Firm—Cushman, Darby & Cushman

[57] ABSTRACT

A head signal process circuit 18 generates a focus error signal representing the distance between an optical disc 11 and an objective lens 20 using a detection signal detected by an optical detector of an optical head 14. The focus error signal is sent to a non-linear amplifying circuit 21. The level of the focus error signal in the vicinity of a servo point is amplified. The level of the focus error signal apart from the servo point is suppressed. The output of the non-linear amplifying circuit 21 is sent to an A/D converter 22. Thus, a servo digital signal is generated.

9 Claims, 7 Drawing Sheets

OPTICAL DISC APPARATUS HAVING IMPROVED READ ACCURACY WITH NON-LINEAR SERVO SIGNAL GAIN DURING TRACK ACCESS AND FOCUS INITIALIZATION

BACKGROUND OF THE INVENTION

1. Field of the Invention

The present invention relates to an optical disc apparatus for optically processing information over an information storage medium such as an optical disc.

2. Description of the Related Art

In recent years, as optical disc apparatuses which process information over an information storage medium, optical disc apparatuses have been actively used. On an optical disc as an information storage medium, spiral-shaped or concentric-shaped information tracks named grooves are formed. In the optical disc apparatus, by forming physical holes, changing magnetic characteristics, or changing metal state at an information track or between information tracks, information is written (recorded) or read (reproduced).

Generally, in the optical disc apparatus, as an optical disc is rotated, a signal surface on which an information signal is recorded vertically moves due to machining accuracy, rotation accuracy, and so forth. To precisely read the information signal, the optical disc apparatus is generally provided with a focusing function for keeping the distance between an objective lens (which focuses a light beam of a light source on a target) and an information storage medium constant. In other words, a focus servo system is used which drives the objective lens corresponding to the vertical movement of the signal surface so that the objective lens focuses a laser beam irradiated by an optical head on the signal surface of the information storage medium.

As described in the Japanese Patent Application Laid-open No. HEI4(1992)-49530, a light beam reflected from the information storage medium is detected by an optical head. The optical head outputs a detection signal. The detection signal is converted into a digital signal by an A/D converter. Corresponding to the resultant signal, the objective lens is driven by a digital servo system.

The output range of the detection signal is limited. Thus, when the optical disc apparatus is operated, the objective lens should be aligned in such a range. To do that, the optical disc apparatus is provided with a circuit which reciprocally moves the objective lens over the optical disc using triangular pulses or the like so as to seek a focus position.

In addition, the optical disc apparatus is provided with a function for causing the focused light spot to target track on the information storage medium. This function is referred to as the tracking function. The tracking function is accomplished in the following manner. A detection signal (representing the distance between a target track on the information storage medium and the light spot) is generated corresponding to the light beam reflected from the information storage medium. The detection signal is converted into a digital signal by an A/D converter. Corresponding to the digital signal, the objective lens is driven by a digital servo system.

As described above, in the conventional optical disc apparatus, both the detection signal for use in the focus servo system and the detection signal for use in the tracking servo system are converted into digital signals by the A/D converters.

However, in the optical disc apparatus, an optical disc can be replaced with another one. Thus, the level of signal varies corresponding to the reflection ratio, the shape of guide grooves, and emboss data (sector mark and so forth). In addition, when the focus servo operation or tracking servo operation is performed, a small variation of signal should be read in the vicinity of a servo point. Thus, the A/D converters should have wide dynamic range and high accuracy. Moreover, when one digit deviates in the A/D converters, the focus servo system is adversely affected. As a result, the servo function may not correctly work.

SUMMARY OF THE INVENTION

An object of the present invention is to provide an optical disc apparatus for improving the reading accuracy of a signal in the vicinity of a servo point, suppressing the peak level of the signal, and for stably controlling focus servo function and tracking servo function against variations of external conditions (such as temperature) and replacement of a disc without necessity of A/D converters having high accuracy and wide dynamic range.

In the optical disc apparatus of the present invention, a non-linear amplifying circuit amplifies a signal with a larger gain in the vicinity of a control target than at its peak. This amplifying circuit amplifies a focus signal and/or a tracking error signal. Corresponding this amplified signal, a drive control signal for driving an objective lens in focus direction and tracking direction is generated.

Thus, in the vicinity of control target point (servo point), the signal can be precisely read. In contrast, in the vicinity of signal peak, the signal can be coarsely read. Thus, the reading accuracy of the signal in the vicinity of the servo point can be improved. In addition, the peak amount of signals can be suppressed. Without necessity of an A/D converter having high accuracy and wide dynamic range, focusing servo function and tracking servo function can be precisely controlled against variations of external conditions (such as temperature) and replacement of a disc.

These and other objects, features and advantages of the present invention will become more apparent in light of the following detailed description of a best mode embodiment thereof, as illustrated in the accompanying drawings.

DETAILED DESCRIPTION OF PREFERRED EMBODIMENTS

Next, with reference to the accompanying drawings, embodiments of the present invention will be described.

Figure 1:
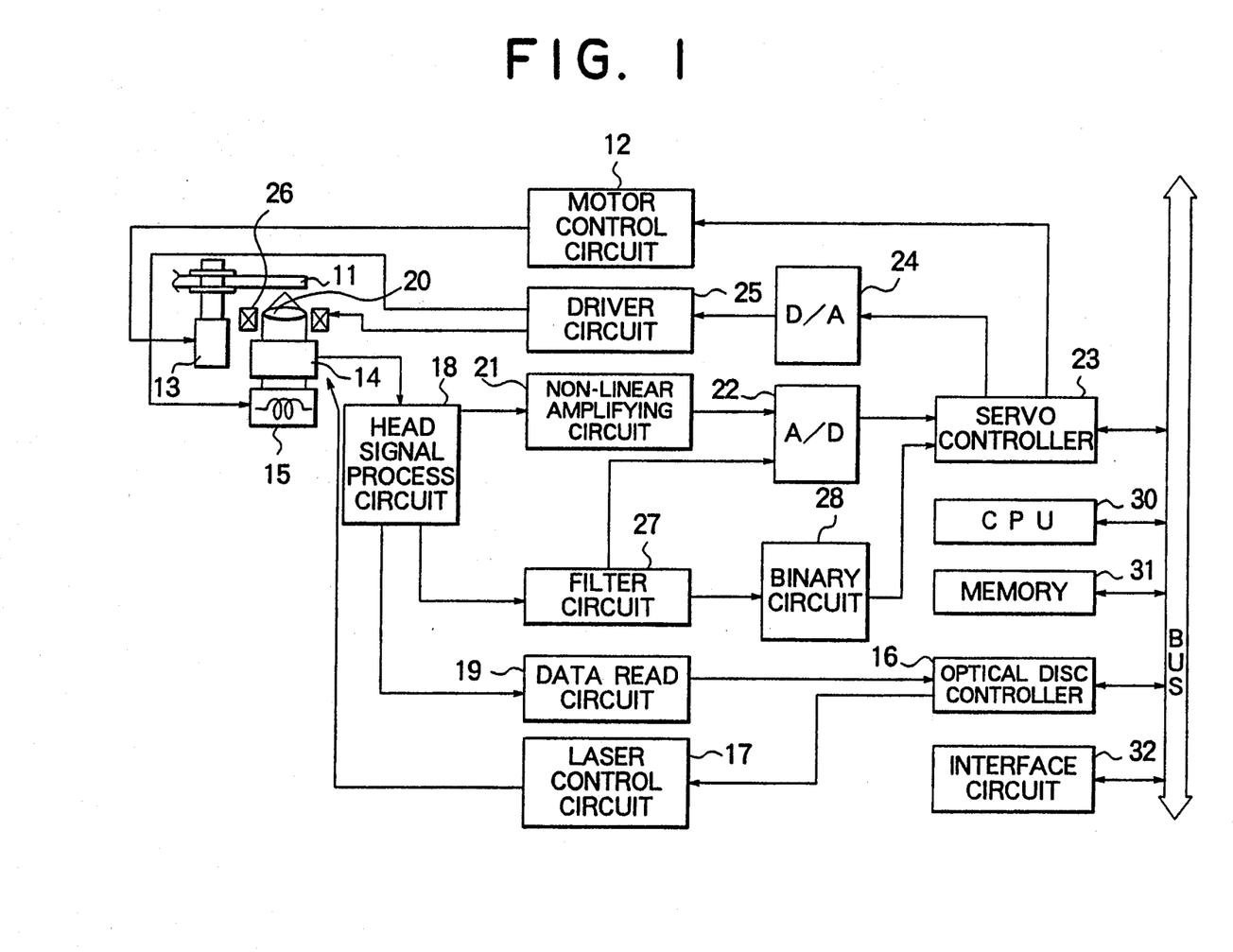
FIG. 1 is a block diagram showing the construction of principal portions of an information processing apparatus according to an embodiment of the present invention.

FIG. 1 shows the construction of principal portions of an optical disc apparatus of the present invention. In the figure, an optical disc 11 is rotated by a spindle motor 13 at for example a constant speed. The motor 13 is controlled by a motor control circuit 12.

On the optical disc 11, spirally-shaped or concentrically-shaped grooves (information tracks) are formed. On each information track, a plurality of sector marks (header information) are recorded at predetermined intervals. A sector mark is formed of a combination of a plurality of physical holes. A sector represents an address of information record area (for example, a track number or a sector number). On the optical disc 11, a light spot is irradiated by a known optical head (pick-up) 14. By irradiating a light spot on the optical disc 11, information can be written (recorded) thereto or read (reproduced) therefrom. The optical head 14 comprises a laser diode which irradiates a laser beam and an optical detector which detects a light beam reflected from the optical disc 11. The optical head 14 is moved in the radial direction of the optical disc 11 by a linear motor 15.

The laser diode of the optical head 14 is controlled by an optical disc controller 16 through a laser control circuit 17. A detection signal detected by the optical detector of the optical head 14 is processed by a head signal process circuit 18 in a particular manner.

Figure 2:
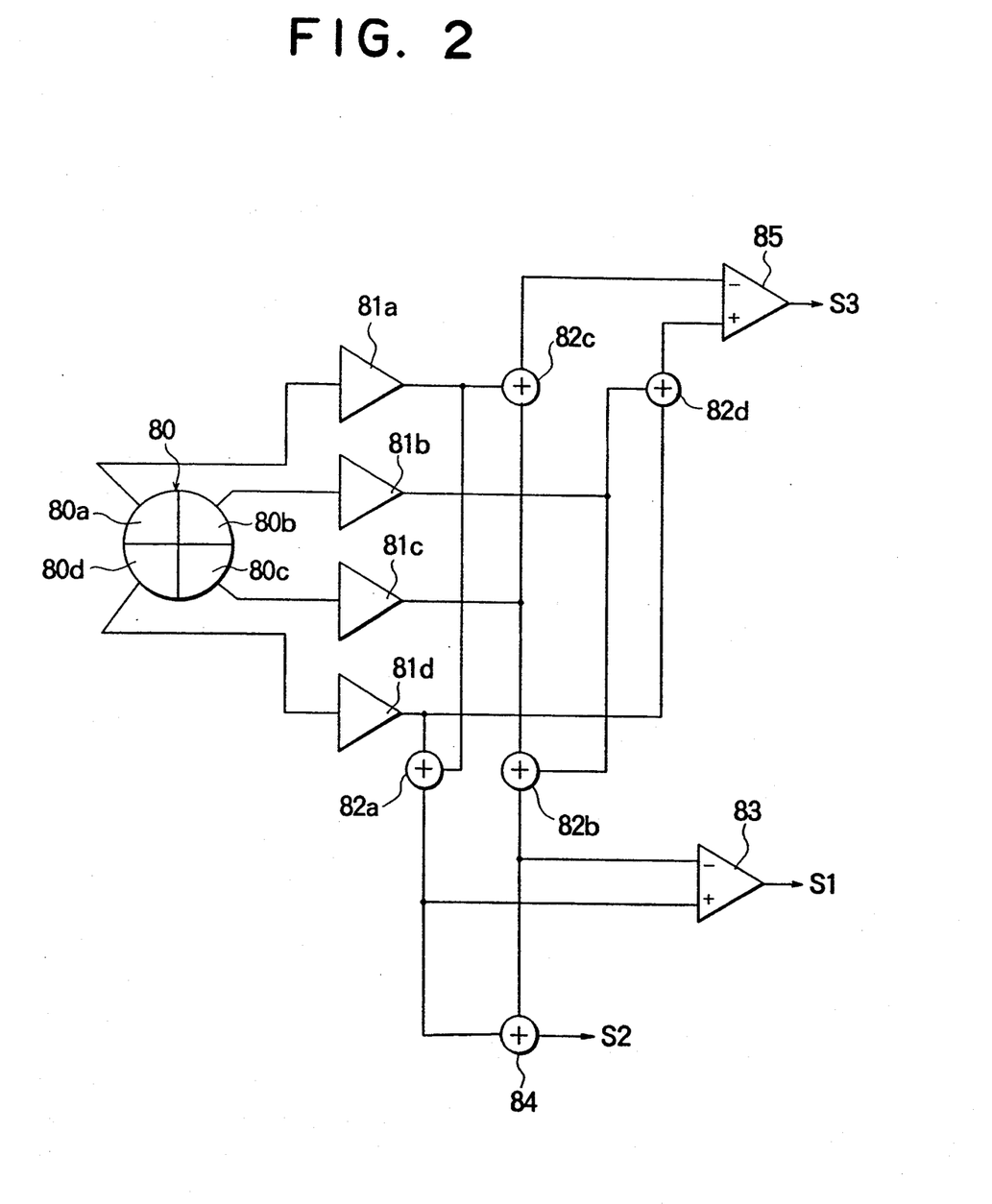
FIG. 2 is a schematic diagram showing the construction of a head signal process circuit of the information processing apparatus of FIG. 1.

FIG. 2 shows the construction of the head signal process circuit 18. In the figure, reference numeral 80 is the optical detector of the optical head 14. The optical detector 80 has four detecting areas 80a, 80b, 80c, and 80d, each of which detects the amount of light.

An output signal of the detecting area 80a is sent to adders 82a and 82c through an amplifier 81a. An output signal of the detecting area 80b is sent to adders 82b and 82c through an amplifier 81b. An output signal of the detecting area 80c is sent to adders 82b and 82c through an amplifier 81c.

An output signal of the adder 82c is sent to both a non-inverted input side of a differential amplifier 83 and an adder 84. An output signal of the adder 82b is sent to both an inverted-input side of the differential amplifier 83 and the adder 84. Thus, an output signal S1 of the differential amplifier 83 is a subtraction signal where the output signal of the adder 82a is subtracted from the output signal of the adder 82b. An output signal S2 of the adder 84 is a sum signal where the output signal of the adder 82a is added to the output signal of the adder 82b. The output signals S1 and S2 are used for performing a tracking control and an access control.

An output signal of the adder 82c is sent to an inverted-input side of a differential amplifier 85. An output signal of the adder 82d is sent to a non-inverted input side of the differential amplifier 85. Thus, an output signal S3 of the differential amplifier 85 is a subtraction signal where the output signal of the adder 82d is subtracted from the output signal of the adder 82c. The output signal S3 is a focus error signal which represents the distance between the optical disc 11 and the objective lens 20.

As shown in FIG. 1, the focus error signal is sent to a non-linear amplifying circuit 21. In the non-linear amplifying circuit 21, the focus error signal in the vicinity of a servo point is amplified, whereas the signal apart therefrom is suppressed. The output of the non-linear amplifying circuit 21 is sent to an A/D converter 22. In the A/D converter 22, a servo digital sinal is generated.

With reference to the servo digital signal, the focusing servo operation is performed so that the value of the servo digital signal matches the servo point. Practically, a signal generated by a servo controller 23 is sent to a D/A converter 24. The D/A converter 24 converts the input signal into an analog signal. The analog signal is sent to an objective lens actuator 26 through a driver circuit 25. Thus, the objective lens actuator 26 performs the focusing servo operation.

Figure 3:
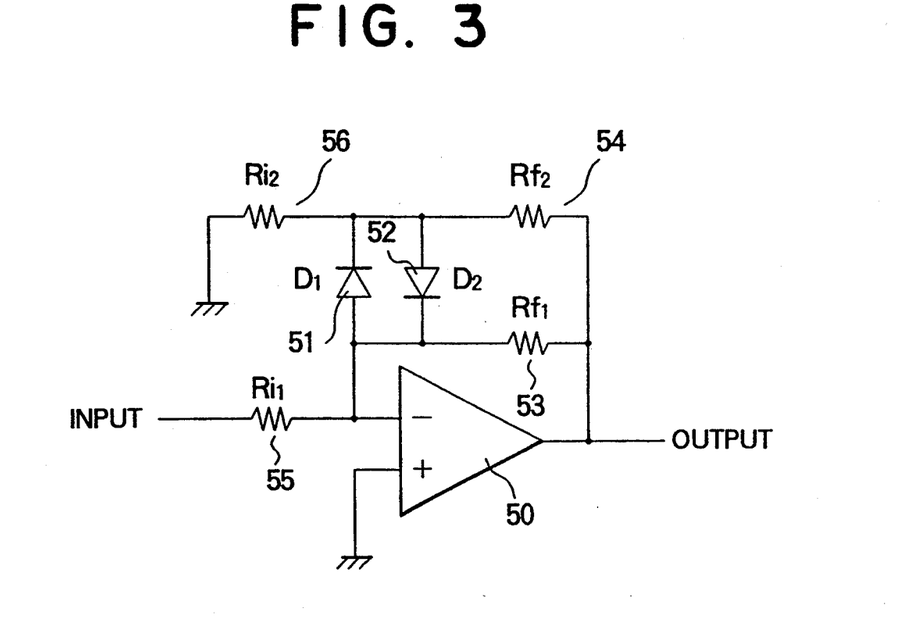
FIG. 3 is a schematic diagram showing the construction of a non-linear amplifying circuit of the information processing apparatus of FIG. 1.

FIG. 3 shows an example of the non-linear amplifying circuit 21. The non-linear amplifying circuit 21 comprises an operational amplifier 50 (which is a conventional inverting amplifying circuit), diodes 51 and 52, feed-back resisters 53 and 54, an input resister 55 (which designates gain), and an input resister 56 (which designates change point).

Figure 4:
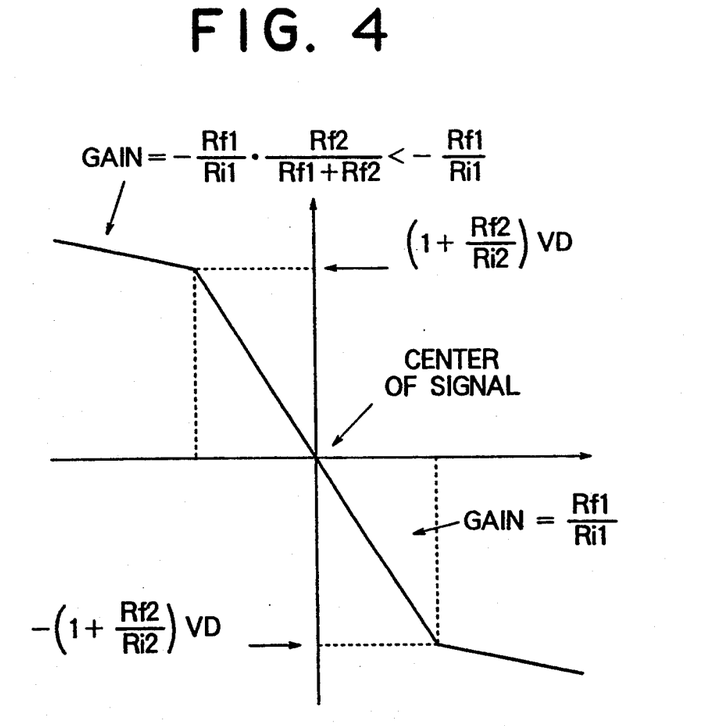
FIG. 4 is a graph showing operational characteristics of the non-linear amplifying circuit of FIG. 1.

FIG. 4 shows input/output characteristics of the non-linear amplifying circuit 21. As shown in the figure, in the vicinity of the center point of the signal, the diodes are in off state. Thus, the non-linear amplifying circuit 21 operates as a normal inverting amplifier. Since a current corresponding to the value of the input signal flows in the resisters 55 and 53, the gain of the output signal becomes—Rf1/Ri1. When the output value exceeds (1+Rf2/Ri2) VD (where VD is the diode forward voltage), the diodes are turned on.

When the diodes 51 and 52 are ideal diodes and a voltage exceeding the diode forward voltage VD is applied to both terminals of the diodes 51 and 52, the resistances of the diodes become 0. Thus, a current flows in the diodes 51 and 52 and thereby they are turned on. Since the minus terminal of the operational amplifier 50 is treated as imaginary short, it is grounded (namely, the voltage of the minus terminal is the same as that of the plus terminal). A voltage where the output signal is divided by the resisters 56 and 54 (namely, a voltage where Ri2/(Ri2+Rf2) is multiplied by the output signal) is applied to the cathode of the diode 51 and the anode of the diode 52. Thus, when the level of the output signal exceeds (1+Rf2/Ri2) VD in comparison with the center point of the signal (ground), the diode 51 or the diode 52 is turned on. When the diode 51 or 52 is turned on, the feed-back resistance of the inverting amplifier of the operational amplifier 50 becomes the resistance of the parallel connection of the resisters 53 and 54 (namely, Rf1×Rf2/(Rf1+Rf2)). Thus, the gain of the amplifying circuit becomes −(Rf1/Ri1)×{Rf2/(Rf1+Rf2)} which is smaller than in the vicinity of the center of the signal. Since the relation of {Rf2/(Rf1+Rf2)<1} is satisfied, the relation of {Rf1/Ri1<(Rf1/Ri1)×{Rf2/(Rf1+Rf2)} is obtained. Thus, the gain in the diode on state is smaller than the gain in the diode off state.

A signal which is input by the resister 56 is equal to the voltage of the plus terminal of the operational amplifier 50. Thus, the input signal of the resister 56 does not affect the output signal of the non-linear amplifying circuit 21.

Figure 5:
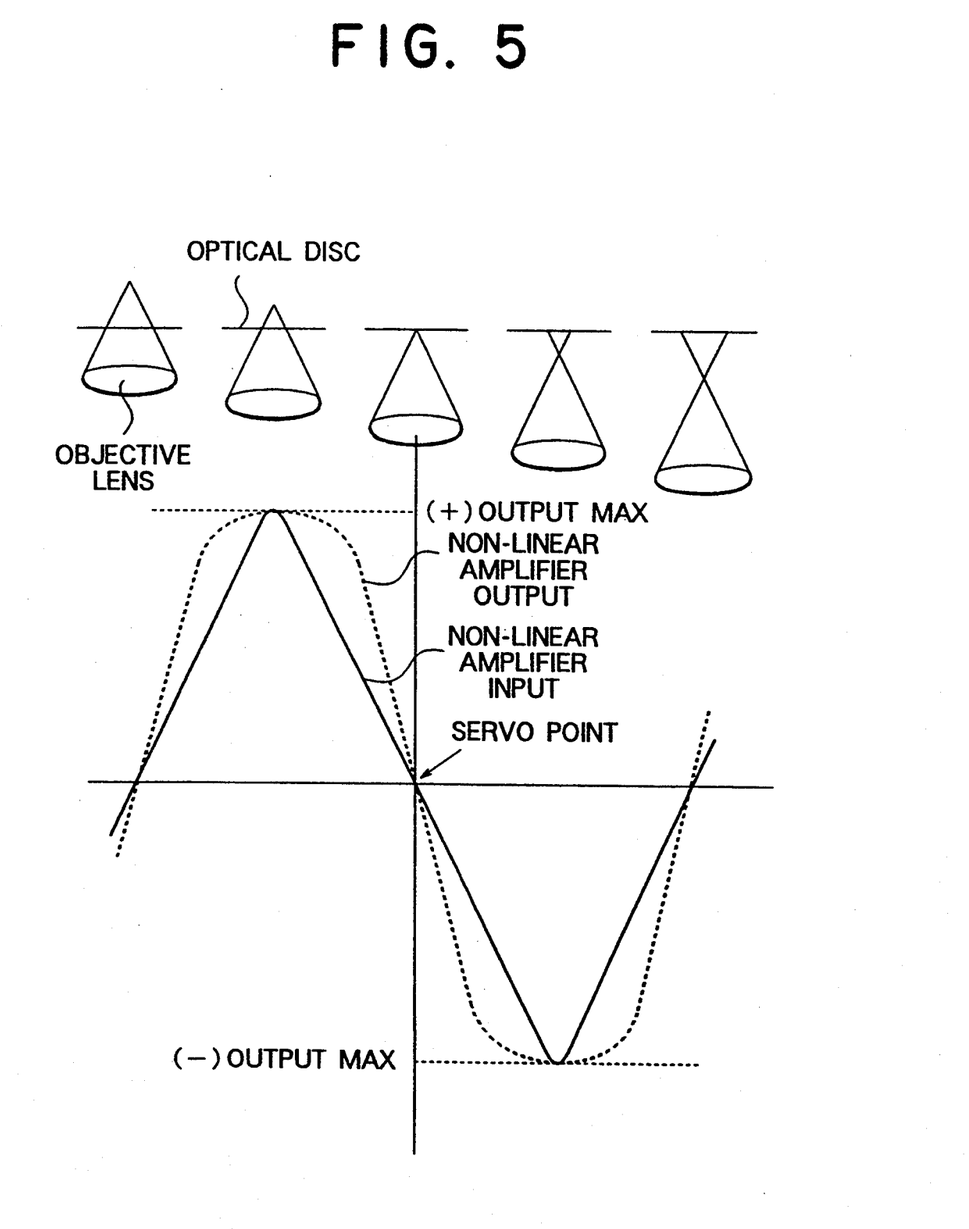
FIG. 5 is a graph for explaining the operation of the information processing apparatus of FIG. 1.

In FIG. 5, the focus error signal which passes through the non-linear amplifying circuit is denoted by a dotted line. The servo point is at the center of operation of the non-linear amplifying circuit (namely, in the vicinity of the voltage of the plus terminal of the operational amplifier 50). Corresponding to the distance between the optical disc 11 and the objective lens 20, the focus error signal which is denoted by a solid line is generated. The focus error signal is nearly symmetrical with respect to the center of the servo point. When this signal passes through the non-linear amplifying circuit, the signal in the vicinity of a servo point is amplified with a large gain, whereas the signal in the vicinity of the peak of the focus error signal is amplified with a small gain. Thus, after the signal is sent to the A/D converter 22, in the vicinity of the servo point, the signal is precisely read. In the vicinity of the signal peak, the signal is coarsely read.

When the servo operation is performed, the level of the focus error signal is not in the vicinity of peak. Only when the focusing operation is performed (namely, the apparatus is turned on), the level of the focus error signal should be in the vicinity of peak. Thus, when the level of the focus error signal is in the vicinity of peak, it is not precisely read. In other words, when the focusing operation is performed, with a signal received from the CPU 30, the objective lens 20 is driven so that it is most separated from or approached to the optical disc 20. Next, the objective lens 20 is gradually approached to the optical disc 11 (or separated therefrom) so as to detect the focus error signal. When the level of the focus error signal exceeds its peak, the focusing servo loop is turned on. Corresponding to the level of the focus error signal at this time, the optical head is moved to the servo point. Thus, when the level of the focus error signal is in the vicinity of peak, it can be coarsely read.

The non-linear amplifying circuit 21 may be any amplifying circuit where the gain of the signal lowers as it is apart from the center (for example, an amplifying circuit with an amplitude limiter or a logarithmic amplifier with a feed-back diode).

As described above, in the head signal process circuit 18 shown in FIG. 1, the signal (S1) for use in the tracking operation and the signal (S2) for detecting the moving direction of the optical head are generated. These signals are sent to the servo controller 23 through the filter circuit 27, the binary circuit 28, and the A/D converter 22. In the servo controller 23, control signals are generated corresponding to these signals. The servo controller 24 drives the objective lens actuator 26 and the linear motor 15 through the D/A converter 24 and the driver circuit 25 by using the control signals.

In FIG. 1, reference numeral 30 is a CPU which generally controls the apparatus. Reference numeral 31 is a memory. Reference numeral 32 is an interface circuit which connects the apparatus to an external unit.

In this embodiment, since the focus error signal for use in the focus servo operation is processed by the non-linear amplifying circuit 21, the accuracy of the focus error signal in the vicinity of the servo point can be improved and the amount of peak of the signal can be suppressed. Thus, without necessity of an A/D converter having high accuracy and wide dynamic range, the focus control can be stably performed against variations of external conditions (such as temperature) and replacement of a disc.

Figure 6:
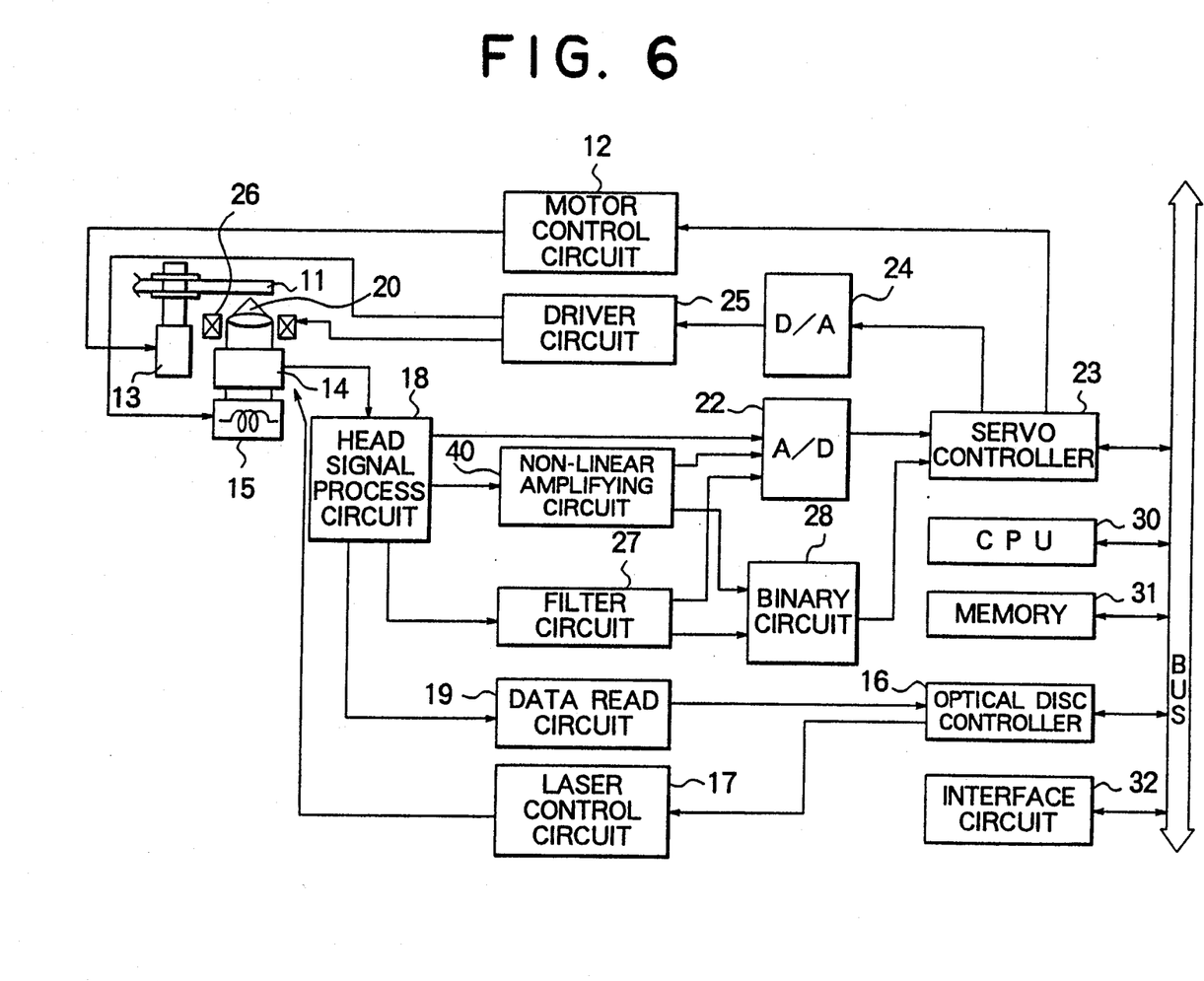
FIG. 6 is a block diagram showing the construction of principal portions of an information processing apparatus according to a second embodiment of the present invention.

Next, with reference to FIG. 6, another embodiment of the present invention will be described.

In this embodiment, the tracking error signal (above-described signal S1) which is generated by the head signal process circuit 18 corresponding to the signal detected by the optical detector in the optical head 14 is sent to a non-linear amplifying circuit 40. The tracking error signal represents the relation of a particular guide groove on the optical disc 11 and a light spot.

The construction of the non-linear amplifying circuit 40 is similar to that of the non-linear amplifying circuit 21 descried in the first embodiment.

Figure 7:
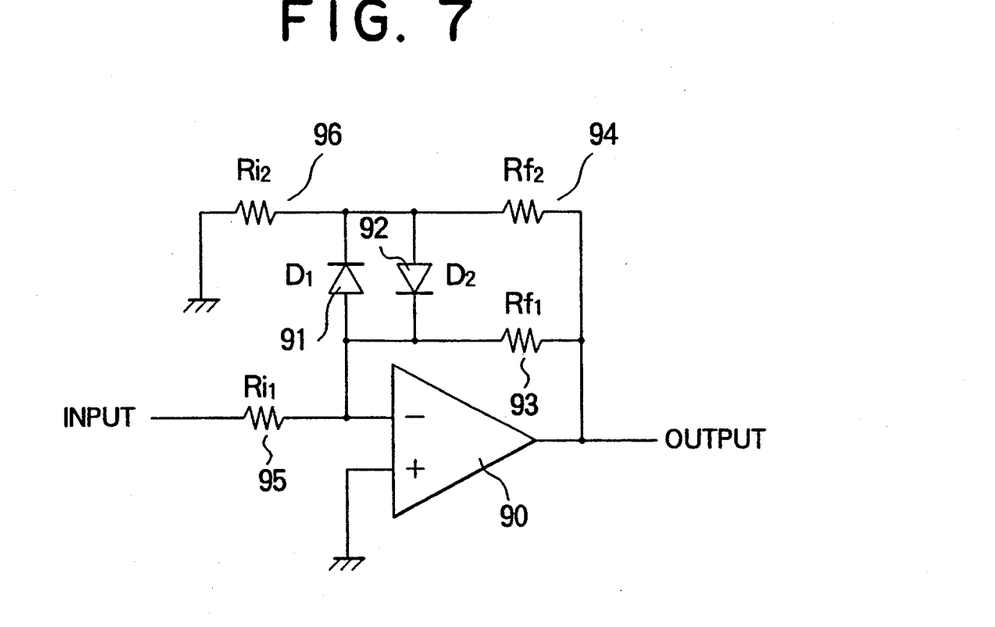
FIG. 7 is a schematic diagram showing the construction of a non-linear amplifying circuit of the information processing apparatus of FIG. 6.

FIG. 7 shows an example of the non-linear amplifying circuit 40. The non-linear amplifying circuit 40 comprises an operational amplifier 90 (which is a conventional inverting amplifying circuit), diodes 91 and 92, feed-back resisters 93 and 94, an input resister 95 (which designates gain), and an input resister 96 (which designates change point).

Figure 8:
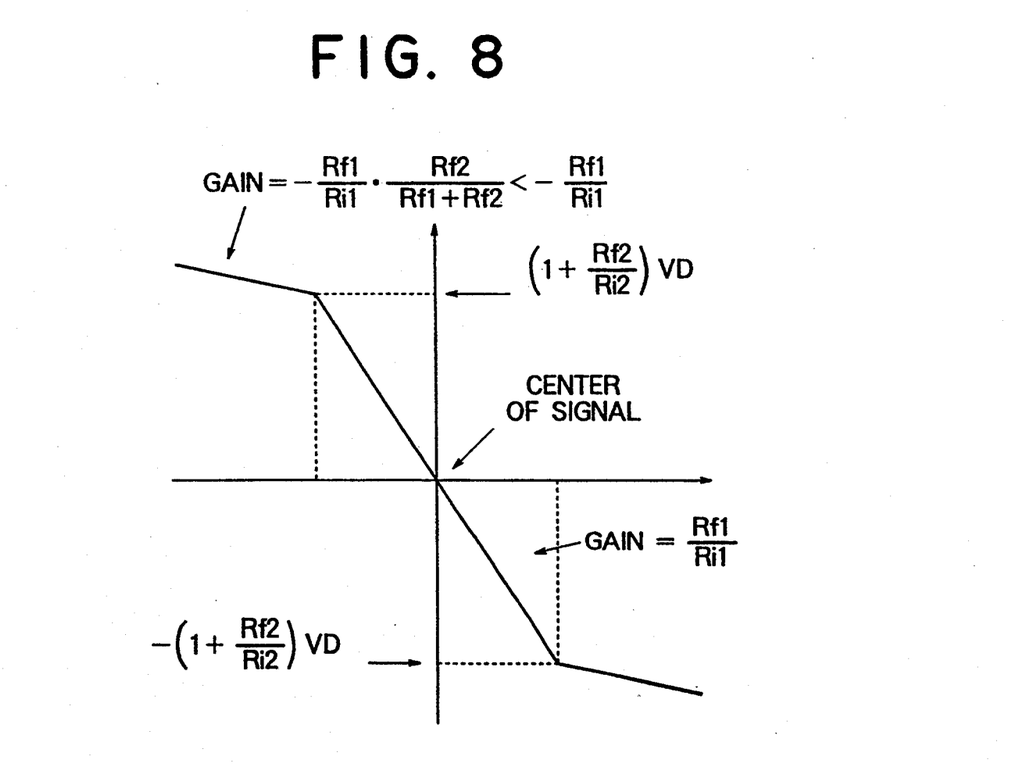
FIG. 8 is a graph showing operational characteristics of the non-linear amplifying circuit of FIG. 6.
Figure 9:
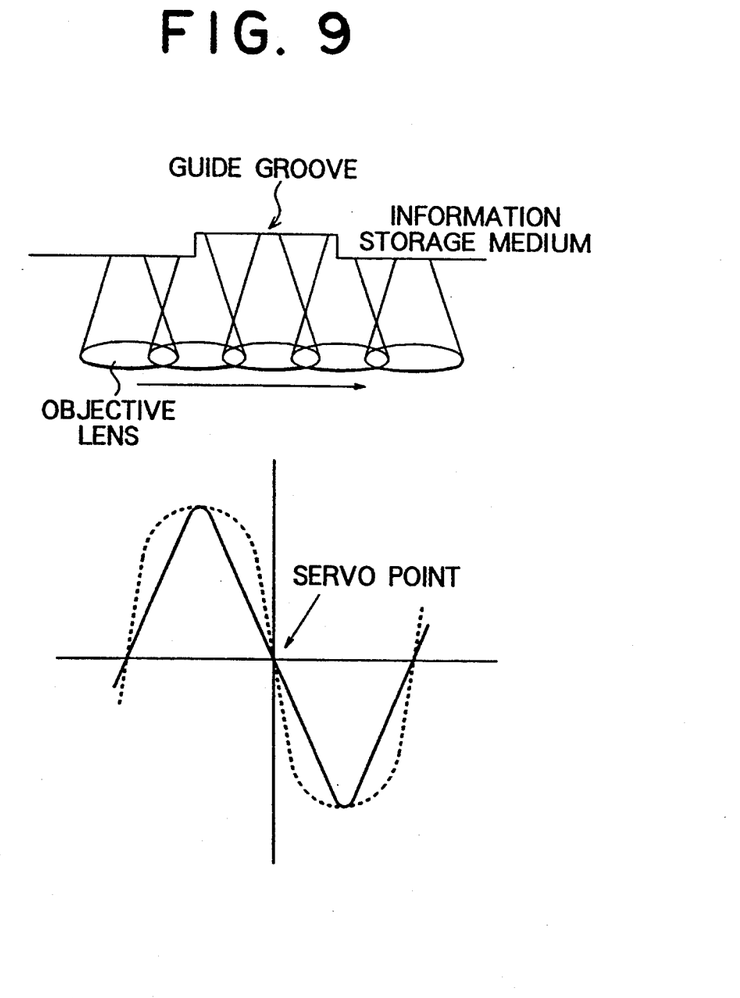
FIG. 9 is a schematic diagram and a graph for explaining the operation of the information processing apparatus of FIG. 6.

FIG. 8 shows input/output characteristics of the non-linear amplifying circuit 40. As shown in the figure, in the vicinity of the center point of the signal, the diodes are in off state. Thus, the non-linear amplifying circuit 40 operates as a normal inverting amplifier. Since a current corresponding to the value of the input signal flows in the resisters 95 and 93, the gain of the output signal becomes Rf1/Ri1. When the output value exceeds $(1+Rf2/Ri2)$ VD (where VD is the diode forward voltage), the diodes are turned on.

When the diodes 91 and 92 are ideal diodes and a voltage exceeding the diode forward voltage VD is applied to both terminals of the diodes 91 and 92, the resistances of the diodes become 0. Thus, a current flows in the diodes 91 and 92 and thereby they are turned on. Since the minus terminal of the operational amplifier 90 is treated as imaginary short, it is grounded (namely, the voltage of the minus terminal is the same as that of the plus terminal). A voltage where the output signal is divided by the resistors 96 and 94 (namely, a voltage where $Ri2/(Ri2+Rf2)$ is multiplied by the output signal) is applied to the cathode of the diode 91 and the anode of the diode 92. Thus, when the level of the output signal exceeds $(1+Rf2/Ri2)$ VD in comparison with the center point of the signal (ground), the diode 91 or the diode 92 is turned on. When the diode 91 or 92 is turned on, the feed-back resistance of the inverting amplifier of the operational amplifier 90 becomes the resistance of the parallel connection of the resisters 93 and 94 (namely, $Rf1 \times Rf2/(Rf1+Rf2)$). Thus, the gain of the amplifying circuit becomes $-(Rf1/Ri1) \times \{Rf2/(Rf1+Rf2)\}$ which is smaller than in the vicinity of the center of the signal. Since the relation of $\{Rf2/(Rf1+Rf2)<1\}$ is satisfied, the relation of $\{Rf1/Ri1 < (Rf1/Ri1) \times \{Rf2/(Rf1+Rf2)\}$ is obtained. Thus, the gain in the diode on state is smaller than the gain in the diode off state.

A signal which is input by the resister 96 is equal to the voltage of the plus terminal of the operational amplifier 90. Thus, the input signal of the resister 96 does not affect the output signal of the non-linear amplifying circuit 40.

The non-linear amplifying circuit 40 amplifies the tracking error signal in the vicinity of the servo point. In contrast, the non-linear amplifying circuit 40 suppresses the tracking error signal which is apart from the servo point. The output of the non-linear amplifying circuit is sent to both the A/D converter 22 and the binary circuit 28. Thus, a servo digital signal is generated.

With reference to the servo digital signal, the focusing servo operation is performed so that the value of the servo digital signal matches the servo point. Practically, the signal generated by the servo controller 23 is converted into an analog signal by the D/A converter 24. Corresponding to the analog signal, the objective lens actuator 26 is driven in the tracking direction through the driver circuit 25 so as to perform the focusing servo operation.

When the servo operation is performed, the level of the tracking error signal is not in the vicinity of peak. The tracking error signal in the vicinity of peak is used when the number of tracks is counted. Next, the track count operation will be briefly described.

When the access operation is performed, the tracking servo operation is turned off. When the optical head 14 is moved by the linear motor 15, as the optical spot traverses a guide groove of the optical disc 11, the tracking error signal varies by one cycle. Thus, by digitizing this signal at the center thereof, a digital signal which varies by one pulse corresponding to one guide groove is generated. Thus, by counting the number of guide grooves that the optical head 14 traverses, the distance that the optical head 14 moves over the optical disc 11 can be determined. By converting the frequency of this pulse to corresponding voltage, the speed of the optical head 14 can be detected. Corresponding to the information of the distance and the speed, the servo controller 23 generates a control signal of the linear motor 15. With the control signal, the linear motor 15 is controlled and thereby the optical disc 11 is accessed. When the level of the tracking error signal is in the vicinity of peak, it is coarsely read.

As described above, in the second embodiment, since the tracking error signal for use in the tracking servo operation is processed by the non-linear amplifying circuit 40, the accuracy of the tracking servo error signal can be improved in the vicinity of the servo point and the peak amount of the signal can be suppressed. Thus, without necessity of an A/D converter having high accuracy and wide dynamic range, the tracking control operation can be stably performed against variations of external conditions (such as temperature) and replacement of a disc.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. An optical disc apparatus for accessing a target area of an optical disc, comprising:
    means for radiating a light beam onto the target area of the optical disc, the radiating means having an objective lens for focusing the light beam on the target area, the objective lens being movable in a focus direction including a focus point;
    means for receiving a reflection light beam reflected from the optical disc to generate an electric signal corresponding to the reflection light beam, the electric signal representing a focusing distance between the objective lens and the target area;
    means for amplifying the electric signal at a first amplification ratio and a second amplification ratio larger than the first amplification ratio to output an amplified signal, the electric signal being amplified at the second amplification ratio when the objective lens is in the vicinity of the focus point and being amplified at the first amplification ratio when the objective lens is far from the focus point; and
    means for moving the objective lens in response to the amplified signal from the amplifying means so as to position the focus point.

2. The optical disc apparatus as set forth in claim 1, further comprising an A/D converter for converting the amplified signal to a digital signal.

3. The optical disc apparatus as set forth in claim 2, wherein movement of the objective lens is controlled based on the digital signal converted by the A/D converter.

4. An optical disc apparatus for accessing a target track of an optical disc on which tracks for bearing information and guides for guiding the tracks are formed in parallel with each other, comprising:
    means for radiating a light beam onto the optical disc, the radiating means being movable toward the target track in a tracking direction across the tracks and the guides;
    means for receiving a reflection light beam reflected from the optical disc and for generating a deviation signal corresponding to the reflection light beam, the deviation signal representing a deviation between the light beam radiated onto the optical disc and the target track;
    means for amplifying the deviation signal at a first amplification ratio and a second amplification ratio larger than the first amplification ratio to output an amplified signal, the deviation signal being linearly amplified at the second amplification ratio when the radiating means is in the vicinity of the target track and being non-linearly amplified at the first amplification ratio when the radiating means is far from the target track;
    means for converting the signal amplified by the amplifying means to a digital signal; and
    means for moving the radiating means in response to the amplified signal from the amplifying means so as to position the light beam on the target track.

5. The optical disc apparatus as set forth in claim 4, wherein movement of the radiating means is controlled based on the digital signal converted by the converting means.

6. An optical disc apparatus for accessing a target area of an optical disc on which tracks for bearing information and guides for guiding the tracks are formed in parallel with each other, comprising:
    means for radiating a light beam onto the target area of the optical disc, the radiating means having an objective lens for focusing the light beam on the target area, the objective lens being movable in a focus direction including a focus point, the radiating means being movable toward the target track in a tracking direction across the tracks and the guides;
    means for receiving a reflection light beam reflected from the optical disc to generate a first electric signal and a second electric signal corresponding to the reflection light beam, the first electric signal representing a focusing distance between the objective lens and the target area, the second electric signal representing a deviation between the light beam radiated onto the optical disc and the target track;

first amplifying means for amplifying the first electric signal at a first amplification ratio and a second amplification ratio larger than the first amplification ratio to output a first amplified signal, the first electric signal being amplified at the second amplification ratio when the objective lens is in the vicinity of the focus point and being amplified at the first amplification ratio when the objective lens is far from the focus point;

first moving means for moving the objective lens in response to the first amplified signal from the first amplifying means so as to position the focus point;

second amplifying means for amplifying the second electric signal at a first amplification ratio and a second amplification ratio larger than the first amplification ratio to output a second amplified signal, the second electric signal being amplified at the second amplification ratio when the radiating means is in the vicinity of the target track and being amplified at the first amplification ratio when the radiating means is far from the target track; and second moving means for moving the radiating means in response to the second amplified signal from the second amplifying means so as to position the light beam on the target track.

7. The optical disc apparatus as set forth in claim 6, further comprising an A/D converter for converting the first amplified signal and second amplified signal to digital signals.

8. The optical disc apparatus as set forth in claim 7, wherein movement of the objective lens is controlled based on the digital signals converted by the A/D converter.

9. The optical disc apparatus as set forth in claim 7, wherein movement of the radiating means is controlled based on the digital signals converted by the A/D converter.

* * * * *